No. 779,967. PATENTED JAN. 10, 1905.
G. E. RINGER.
TRAP FOR CATCHING AND MOVING HOGS.
APPLICATION FILED APR. 12, 1904.
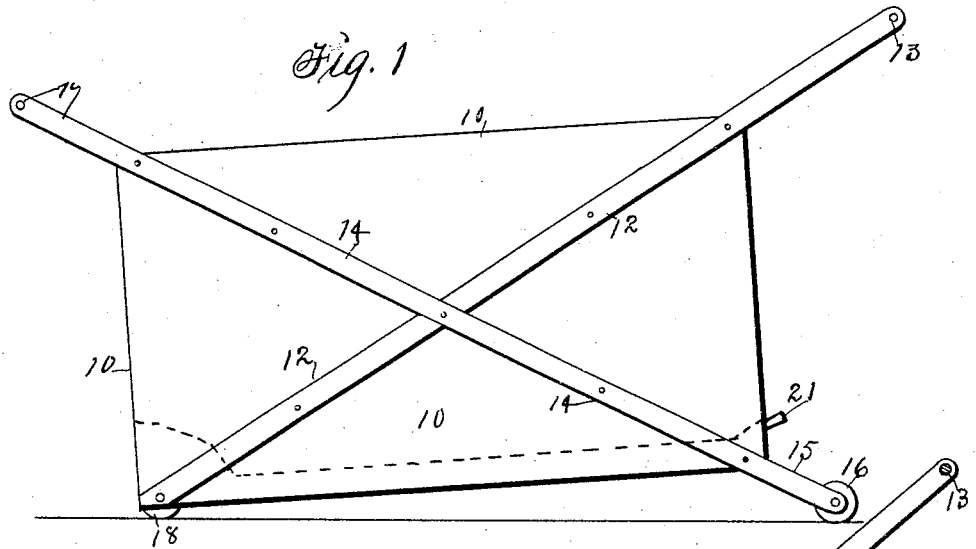
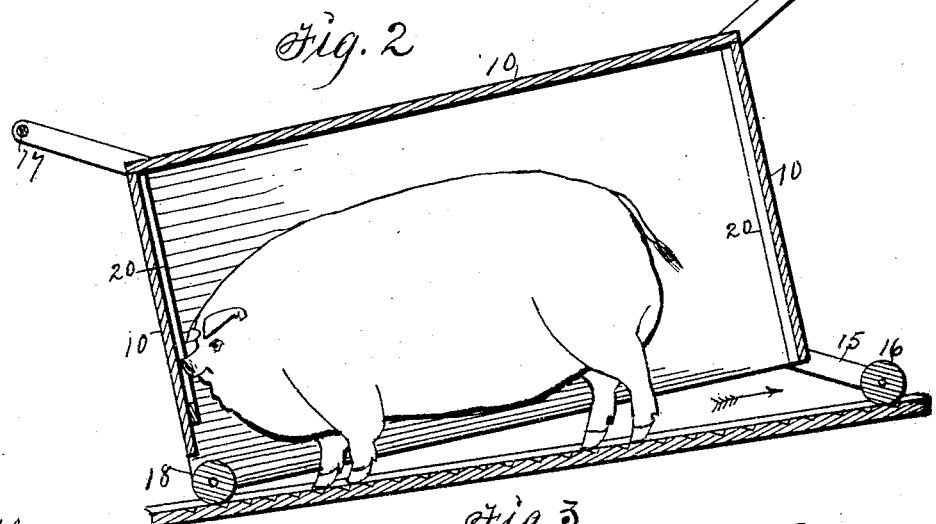
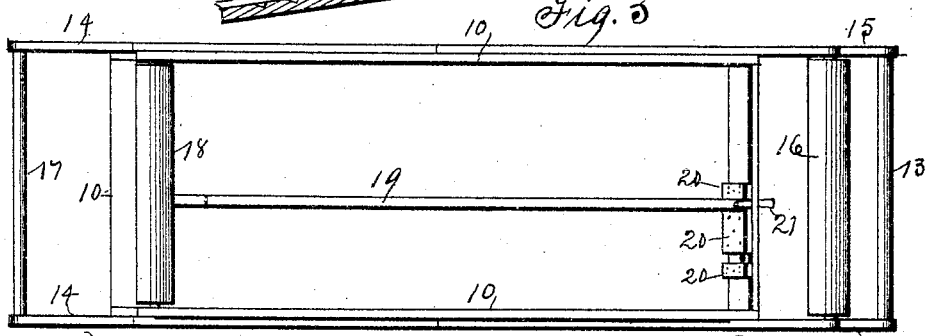
Witnesses: Inventor: Gustave E. Ringer,
By Thomas G. Orwig, Attorney.

No. 779,967. Patented January 10, 1905.

UNITED STATES PATENT OFFICE.

GUSTAVE E. RINGER, OF LEMARS, IOWA.

TRAP FOR CATCHING AND MOVING HOGS.

SPECIFICATION forming part of Letters Patent No. 779,967, dated January 10, 1905.

Application filed April 12, 1904. Serial No. 202,869.

*To all whom it may concern:*

Be it known that I, GUSTAVE E. RINGER, a citizen of the United States, residing at Lemars, in the county of Plymouth and State of Iowa, have invented a new and useful Trap for Catching and Moving Hogs, of which the following is a specification.

My object is to provide a portable trap specially adapted for catching hogs without laying hands on them, and also specially adapted for moving hogs in the trap on the level or on an inclined plane and in and out of a wagon or car without lifting the weight of the trap and hog therein.

My invention consists in the structure hereinafter set forth, pointed out in my claims, and illustrated in the accompanying drawings, in which—

Figure 1 is a side view of the trap in position on a level plane as required for moving it backward and forward by means of the handles extending upwardly inclined from the corners at its top. Fig. 2 is a longitudinal sectional view that shows the trap on an inclined plane and a hog in position therein as required to move the trap and hog upward. Fig. 3 is a bottom view of the trap and shows a partition adjustably connected therewith as required to adapt the trap for hogs of different sizes.

The numeral 10 designates an open-bottomed box made of wood and that may vary in size and weight and strength as desired to be adapted for hogs of various size and strength. To the outside of its parallel sides are fixed, by means of nails, screws or rivets, or in any suitable way, straight bars 12, to extend diagonally from the front lower corners to the upper rear corners and to project beyond some distance, to be connected at their ends by a cross-piece 13, adapted to serve as a handle for pulling, pushing, and lifting the trap. In crossed position to the bars 12 are fixed straight bars 14, that extend beyond the lower rear corners to serve as bearers 15 for a roller 16 journaled thereto. Their upper ends extend forward and are connected by a cross-piece 17 as required to produce a handle that can be seized by hand for pushing and pulling and lifting the trap. The bars 12 and 14 thus fixed to the box stiffen and strengthen the box.

In the front and lower end of the trap is journaled a roller 18 in such a manner that it will allow the front end portion of the trap to come close to the ground, as required to prevent a hog from getting her nose under the trap to lift it. If a hog tries to lift the trap by pressing her nose against the roller, the roller will turn and prevent her from lifting the trap. For this reason the front end of the trap is to be at the front of a hog and also to make the hog walk backward in place of forward in moving her about by means of the trap. The rear end of the trap will always be elevated and will admit light, that will induce the hog therein to slip backward from the front dark end toward the light in the rear end.

A partition 19 is adjustably and detachably fitted in the trap to extend vertically and longitudinally by means of cleats 20, fixed to the inside faces of the ends of the trap or box 10, and a pin 21, as shown in Fig. 3, or in any suitable way.

In the practical use of my invention to catch a hog it is only necessary to press down on the handle 13 at the rear end of the trap, to raise the front end of the trap above the top of the hog that is to be caught, and to then move the trap to the rear end of the hog close enough to allow the front end of the trap to be suddenly dropped over the hog. To move a hog thus inclosed in the trap, a person at the rear end may pull on the handle 13 and a person at the front end may push on the handle 17, and thereby induce the hog to walk rearward on the level surface or on an inclined plane, as required to transfer the animal from place to place or on and off a wagon or car without touching or lifting it.

Having thus set forth the purpose of my invention and its construction and manner of use, its practical operation and utility will be readily understood by persons familiar with the stubborn propensities of hogs and the difficulties of catching and holding and transferring them from place to place and to and from wagons and cars.

What I claim as new, and desire to secure by Letters Patent, is—

1. In a trap for catching and moving hogs, an open-bottomed box having a roller journaled to its parallel sides below the front end piece and roller-bearers fixed to its lower rear corners to extend rearward and downward and a roller journaled to said bearers and handles for lifting and moving the box in the manner set forth, for the purposes stated.

2. A trap for catching and moving hogs, comprising an open-bottomed box, a roller journaled in the sides below the front end piece, roller-bearers at its rear end extending rearward and downward, a roller in said bearers, a handle projecting upward and forward from the front and top of the box and a handle projecting rearward and upward from the rear end and top of the box, arranged and combined to operate in the manner set forth, for the purposes stated.

3. A trap for catching and moving hogs, consisting of an open-bottomed box, straight bars fixed to the parallel sides of the box in crossed position and connected at their upper ends by cross-pieces and the lower ends of two parallel bars extended at the rear lower corner of the box and a roller journaled to them and a roller below the front end piece of the box, arranged and combined to operate in the manner set forth for the purposes stated.

4. A trap for catching and moving hogs, consisting of an open-bottomed box, straight bars fixed to the parallel sides of the box in crossed position and connected at their top ends by cross-pieces and the lower ends of two parallel bars extended at the rear lower corner of the box and a roller journaled to them and a roller below the front end piece of the box, and an adjustable partition in the box, arranged and combined to operate in the manner set forth, for the purposes stated.

G. E. RINGER.

Witnesses:
J. R. WHORTON,
JURGEN JEBENS.